(12) United States Patent
Okamura et al.

(10) Patent No.: US 8,436,322 B2
(45) Date of Patent: May 7, 2013

(54) RADIATION IMAGE CONVERSION PANEL

(75) Inventors: Shinichi Okamura, Tokyo (JP); Tadashi Arimoto, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 215 days.

(21) Appl. No.: 12/934,013

(22) PCT Filed: Feb. 4, 2009

(86) PCT No.: PCT/JP2009/051863
§ 371 (c)(1),
(2), (4) Date: Sep. 22, 2010

(87) PCT Pub. No.: WO2009/122772
PCT Pub. Date: Oct. 8, 2009

(65) Prior Publication Data
US 2011/0017925 A1    Jan. 27, 2011

(30) Foreign Application Priority Data

Mar. 31, 2008 (JP) ................................ 2008-090003

(51) Int. Cl.
*H05B 33/00* (2006.01)
(52) U.S. Cl.
USPC ..................................... 250/484.2
(58) Field of Classification Search ............... 250/484.2, 250/484.4, 486.1
See application file for complete search history.

(56) References Cited

U.S. PATENT DOCUMENTS

| 3,859,527 | A | | 1/1975 | Luckey | |
|---|---|---|---|---|---|
| 4,769,549 | A | * | 9/1988 | Tsuchino et al. | 250/484.4 |
| 4,963,751 | A | * | 10/1990 | Kano et al. | 250/484.4 |
| 2005/0082495 | A1 | * | 4/2005 | Nakano et al. | 250/484.4 |

FOREIGN PATENT DOCUMENTS

| JP | 55012144 | 1/1980 |
|---|---|---|
| JP | 61142500 | 6/1986 |
| JP | 62039737 | 2/1987 |
| JP | 62110200 | 5/1987 |
| JP | 02058000 | 2/1990 |
| JP | 2003050298 | 2/2003 |
| JP | 2004212090 | 7/2004 |
| JP | 2005164312 | 6/2005 |
| JP | 2007-240306 | 9/2007 |
| JP | 2008-014892 | 1/2008 |

OTHER PUBLICATIONS

Japanese Office Action, Patent Application No. 2010-505424, date mailed Oct. 2, 2012.
English translation of Japanese Office Action, Patent Application No. 2010-505424, date mailed Oct. 2, 2012.

* cited by examiner

*Primary Examiner* — David Porta
*Assistant Examiner* — Faye Boosalis
(74) *Attorney, Agent, or Firm* — Lucas & Mercanti, LLP

(57) ABSTRACT

A radiation image conversion panel which is excellent in luminance and sharpness is disclosed, comprising a phosphor layer formed on a support by a process of vapor growth, and the support comprising a resin and exhibiting a linear thermal expansion coefficient of 20 to 70 ppm/° C.

12 Claims, No Drawings

RADIATION IMAGE CONVERSION PANEL

This is a 371 of PCT/JP2009/051863 filed Feb. 4, 2009 which in turn claimed the priority of Japanese Patent Application No. 2008-090003 filed Mar. 31, 2008, both applications are incorporated by reference herein.

FIELD OF THE INVENTION

The present invention relates to a radiation image conversion panel employing a phosphor.

TECHNICAL BACKGROUND

Radiographic images such as X-ray images have been largely used in the field of disease diagnosis or the like. To obtain such radiographic images, there have been broadly employed a radiography system in which X-rays transmitted through a subject are irradiated onto a phosphor layer (fluorescent screen), thereby producing visible light and the visible light is irradiated onto a silver halide photographic material (hereinafter, also denoted simply as photographic material) in a manner similar to conventional photography, followed by being processed to obtain visible silver images.

However, a new method of taking an image directly from a phosphor layer has recently advanced instead of an image forming method by use of a silver halide photographic material. In this method, a radiation having been transmitted through a subject is absorbed in a phosphor and then, exciting the phosphor by light or heat energy causes a radiation energy accumulated in the phosphor through absorption to radiate as phosphorescence, and the phosphorescence is detected to achieve imaging.

Specifically, there is known a radiation image conversion method using a photostimulable phosphor (as describe din, for example, Patent documents 1 and 2). This method employs a radiation image conversion panel comprising a photostimulable phosphor layer containing a photostimulable phosphor, in which the photostimulable phosphor of the radiation image conversion panel is exposed to a radiation transmitted through a subject and accumulates radiation energy corresponding to radiation transmission densities of the respective portions of the subject; thereafter, radiation energy accumulated in the photostimulable phosphor is emitted as stimulated emission by exciting the photostimulable phosphor in a chronological order by an electromagnetic wave (exciting light) such as visible light, infrared rays or the like and signals based on intensities of this light are photoelectrically converted to obtain electric signals and the obtained signals are reproduced as a visible image on a recording material such as a photosensitive material or a display device such as CRT.

The foregoing reproduction method of a radiation image has an advantage such that, compared to conventional radiography by a combination of conventional radiographic film and an intensifying screen, a radiation image rich in information content can be obtained at much lower radiation exposure.

The radiation image conversion panel employing such a photostimulable phosphor, after storage of radiation image information, releases a stored energy through scanning by an exciting light, so that storage of radiation image information can be performed, enabling repeated use thereof. Namely, conventional radiography consumes radiographic film for every photographing; on the contrary, the radiation image conversion method repeatedly uses a radiation image conversion panel, which is advantageous in terms of resource protection and economic efficiency.

Recently, diagnostic image analysis requires a radiation image conversion panel with further enhanced sharpness. To achieve enhanced sharpness, for example, there were made attempts of controlling the shape of the formed photostimulable phosphor particles, thereby achieving enhancement of sensitivity and sharpness.

One of such attempt is, for example, a method employing a photostimulable phosphor layer comprised of finely columnar blocks formed by depositing a photostimulable phosphor on a support having a fine concave-convex pattern, as described in JP) 61-142497A.

There were further proposed a method of using a radiation image conversion panel provided with a photostimulable phosphor layer developed by subjecting cracks between columnar blocks formed by deposition of a photostimulable phosphor to a shock treatment (as described, for example, in patent document 3); a method of using a radiation image conversion panel in which cracks were caused from the surface side of a photostimulable phosphor layer formed on the support surface (as described in, for example, patent document 4); and a method in which a photostimulable phosphor layer including voids was formed by vapor deposition on a support, followed by a heating treatment to allow the voids to grow to provide cracks (as described in, for example, patent document 5).

There was also proposed a radiation image conversion panel comprising a photostimulable phosphor layer having formed, on a support, thin columnar crystals with an inclination angle to the normal of the support (as described in, for example, patent document 6).

Recently, there was proposed a radiation image conversion panel using a photostimulable phosphor mainly composed of an alkali halide such as CsBr and activated with Eu, and the activator of Eu enabling to derive enhanced X-ray conversion efficiency which was never achieved before.

When forming a photostimulable phosphor through vapor deposition, means for achieving enhanced luminance include an increase of a phosphor layer thickness. In that case, when continuing deposition, columnar crystal become thicker as the layer thickness increases, resulting in decreased spaces between columnar crystals and leading to disappearance thereof, or causing cracks in the phosphor layer and resulting in insufficient effects of the columnar crystals and leading to insufficient image sharpness.

Patent document 1: U.S. Pat. No. 3,859,527,
Patent document 2: JP 55-012144A,
Patent document 3: JP 61-142500A,
Patent document 4: JP 62-039737A,
Patent document 5: JP 62-110200A,
Patent document 6: JP 02-058000A,
Patent document 7: JP 2003-50298A.

DISCLOSURE OF INVENTION

Problems to be Solved

The present invention has come into being in view of the foregoing circumstances and it is an object of the invention to provide a radiation image conversion panel excellent in luminance and sharpness.

Means for Solving the Problems

The foregoing problems related to the invention can be overcome the following constitution:

1. A radiation image conversion panel, wherein the radiation image conversion panel comprises a phosphor layer formed on a support by a process of vapor growth and the support comprises a resin as a constituent and exhibits a linear thermal expansion coefficient of 20 to 70 ppm/° C.

2. The radiation image conversion panel as described in 1, wherein the linear thermal expansion coefficient is from 30 to 60 ppm/° C.

3. The radiation image conversion panel as described in 1 or 2, wherein the average filling ratio of a phosphor in the phosphor layer is from 60 to 90%.

4. The radiation image conversion panel as described in any of 1 to 3, wherein the filling ratio of a phosphor in the phosphor layer is 65% to 85%.

5. The radiation image conversion panel as described in any of 1 to 4, wherein the thickness of the phosphor layer is from 100 to 1500 μm.

6. The radiation image conversion panel as described in any of 1 to 5, wherein the thickness of the phosphor layer is 200 to 1000 μm.

Effect of the Invention

The foregoing means of the invention can provide a radiation image conversion panel superior in luminance and sharpness.

PREFERRED EMBODIMENTS OF THE INVENTION

The radiation image conversion panel of the invention is featured in that the radiation image conversion panel comprises a phosphor layer which was formed on a support by a vapor growth process and the support comprises a resin as a constituent, and the linear thermal expansion coefficient of the support being from 20 to 70 ppm/° C. This feature is in common in the invention related to the foregoing 1 to 6.

In one preferred embodiment of the invention, the foregoing linear thermal expansion coefficient is from 30 to 60 ppm/° C. in terms of difference in expansion or shrinkage between the support and a phosphor constituent which is caused by temperature variation in the process of forming the phosphor layer.

In another preferred embodiment of the invention, the average filling ratio of a phosphor in the phosphor layer is from 60 to 90% in terms of prevention of cracking and enhancements of sharpness and luminance. More preferably, the average filling ratio of a phosphor in the phosphor layer is from 65 to 85%. Thereby, the allowable range of thermal expansion coefficient of a support to achieve the effect of the invention is expanded, resulting in increased choices for the support.

Further, in the invention, the thickness of the phosphor layer is preferably from 100 to 1500 μm, and more preferably from 200 to 1000 μm.

In the following, there will be described the present invention and its constituent features, and preferred forms and embodiments of the invention.

Support:

The support related to the invention contains a resin as a constituent and the coefficient of linear thermal expansion of the support is from 20 to 70 ppm/° C. The coefficient of linear thermal expansion of the support is preferably from 30 to 60 ppm/° C. In the case of a linear thermal expansion coefficient being too low or too high, temperature change in the process of forming the phosphor layer when preparing an image conversion panel results in increased difference in expansion or shrinkage, sometimes causing cracking of the phosphor layer.

A support usable in the invention contains a resin as a main constituent and is not specifically restricted so long as its linear thermal expansion coefficient falls within the foregoing range.

Specific examples thereof include resin films such as aramid film, polyimide film, polyetherimide film, polysulfone film, polycarbonate film, polyolefin film, polyethersulfone film, and polyphenylene sulfide film.

Of these, aramid film, polyimide film and polyetherimide film are preferred.

It is also preferred to employ a film containing, as a constituent, a mixture constituting various kinds of films or copolymer.

Phosphor Raw Material:

The phosphor layer preferably contains a phosphor mainly comprised of an alkali halide represented by the following formula (1):

$$M^1X \cdot aM^2X'_2 \cdot bM^3X''_3 : eA \qquad \text{formula (1)}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X', X" and X''' are each at least one halogen atom selected from the group consisting of F, Cl, Br and I atoms; A is at least one metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are $0 \leq a < 0.5$, $0 \leq b < 0.5$ and $0 \leq e \leq 0.2$, respectively. There will be photostimulable phosphors represented by the foregoing formula (1).

In the photostimulable phosphors represented by the formula (1), $M^1$ is at least one alkali metal atom selected from atoms of Li, Na, K, Rb and Cs, preferably at least one alkali metal atom selected from atoms of Rb and Cs, and more preferably a Cs atom.

$M^2$ is at least one divalent metal atom selected from atoms of Be, Mg, Ca, Sr, Ba, Zn, Cd, Cu and Ni, and preferably at least one divalent metal atom selected from atoms of Be, Mg, Ca, Sr and Ba.

$M^3$ is at least one trivalent metal atom selected from atoms of Sc, Y, La, Ce, Pr, Nd, Pm, Sm, Eu, Gd, Tb, Dy, Ho, Er, Tm, Yb, Lu, Al, Ga and In, and preferably at least one trivalent metal atom selected from atoms of Y, Ce, Sm, Eu, Al, La, Gd, Lu, Ga and In.

A is at least one metal selected from atoms of Eu, Tb, In, Ce, Tm, Dy, Pr, Ho, Nd, Yb, Er, Gd, Lu, Sm, Y, Tl, Na, Ag, Cu and Mg.

X', X" and X''' are each at least one halogen atom selected from F, Cl, Br and I atoms in terms of enhanced luminance of stimulated emission of a photostimulable phosphor, preferably at least one halogen atom selected from F, Cl and Br atoms, and more preferably Br atom.

When e>0 in the formula (1), the compound represented by the formula (1) is a phosphor, which is also a phosphor mother raw material.

When e=0 in the formula (1), there are cited specific examples of the compound represented by the formula (1), as below.

There is used (a) at least one compound selected from NaF, NaCl, NaBr, NaI, KF, KCl, KBr, KI, RbF, RbCl, RbBr, RbI, CsF, CsCl, CsBr and CsI.

There is used (b) at least one compound selected from $MgF_2$, $MgCl_2$, $MgBr_2$, $MgBr_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CugF_2$, $CuCl_2$, $CuBr_2$, $CuI_2$, $NiF_2$, $NiCl_2$, $NiBr_2$ and $NiI_2$.

When e=0 in the formula (1), it is preferred to use a mixture of a compound of the formula (1) and the following compound (2):

Compound (2): compound containing at least one atom selected from Eu, Tb, In, Cs, Ce, Tm, Dy, Pr, Ho, Nd, Yb, Er, Gd, Lu, Wm, Y, Ti, Na, Ag, Cu and Mg.

The compound (2) preferably is a europium compound. Preferred examples of such a europium compound $EuX_2$, $EuX_3$, and EuOX (in which X is F, Cl, Br, I or their combination). Of these, $EuBr_3$, $EuBr_2$, $EuCl_2$ and EuOBr gave excellent results.

Vapor Growth Process of Phosphor:

The phosphor layer of the invention is featured in that the phosphor layer is formed by a vapor growth process, that is, by depositing a phosphor on a support. Examples of such a vapor growth process include an evaporation process, a sputtering process, a CVD process and an ion plating process.

In the invention, there are cited, for example, the following processes.

Firstly, in the evaporation process, a support is placed within an evaporation apparatus and the inside of the apparatus is evacuated up to a degree of vacuum of approximately $1.333 \times 10^{-4}$ Pa. Subsequently, at least one of the foregoing photostimulable phosphors is evaporated with heating by a method such as resistance heating method or an electron beam method to grow a photostimulable phosphor of a desired thickness on the surface of the support. Thereby, there is formed a photostimulable phosphor layer not containing a binder. The foregoing evaporation process may be repeated plural times to form the photostimulable phosphor layer.

Alternatively, it is feasible that, using plural resistance heaters or electron beam means in the evaporation process, co-evaporation is conducted, whereby synthesis of the targeted photostimulable phosphor and formation of the photostimulable phosphor layer are concurrently performed.

After completion of evaporation, a protective layer is optionally provided on the side opposite the support of the photostimulable phosphor layer, whereby a radiation image conversion panel related to the invention is prepared. There may be conducted formation of a photostimulable phosphor layer on the protective layer, and further thereon, a support being provided.

In the vapor deposition method, the material subject to deposition (support, protective layer or intermediate layer) may be cooled or heated during evaporation.

Further, after completion of evaporation, the photostimulable phosphor layer may be subjected to a heating treatment. In the evaporation process, a gas such as $O_2$ or $H_2$ may be introduced during the evaporation stage to perform reactive evaporation.

Secondly, in the sputtering process, similarly to the foregoing vapor deposition process, a support having a protective layer or an intermediate layer is placed in the sputtering apparatus and the inside of the apparatus is evacuated to a degree of vacuum of approximately $1.333 \times 10^{-4}$ Pa. Subsequently, an inert gas, Ar, Ne or the like, used for sputtering is introduced into the sputtering apparatus and a gas pressure is maintained at approximately $1.333 \times 10^{-1}$ Pa. Then a photostimulable phosphor as a target is subjected to sputtering to grow a photostimulable phosphor layer up to the desired thickness.

Similarly to the vapor deposition method, various treatments are applicable to the sputtering method.

There are also cited a CVD process as a third method and an ion plating process as a fourth method.

The growth rate of a phosphor layer in the vapor growth process described above is preferably from 0.05 to 300 μm/min. A growth rate of less than 0.05 μm/min, which results in decreased productivity of the radiation image conversion panel related to the invention, is not preferable. Further, a growth rate exceeding 300 μm/min, which makes it difficult to control the growth rate, is also not preferred.

When obtaining a radiation image conversion panel by the above-described vacuum vapor deposition process or sputtering process, non-existence of a binder results in increased filling density of the photostimulable phosphor, whereby a radiation image conversion panel exhibiting preferable sensitivity and resolving power is obtained.

In preparation of a phosphor layer by the vapor growth process, the temperature of the substrate on which a phosphor layer is formed is preferably not less than 40° C., more preferably not less than 80° C., and still more preferably from 100 to 400° C.

The average filling ratio of the phosphor of a phosphor layer is preferably from 60 to 90% in terms of cracking inhibition, sharpness and luminance, and more preferably from 65 to 85%.

It was proved that designation of the average filling ratio of a phosphor of a phosphor layer, falling within the foregoing range resulted in cracking inhibition, and markedly enhanced sharpness and luminance. In one aspect, this results in advantages such that the allowable range of the thermal expansion coefficient of a support to achieve the effect of the invention is broadened, resulting in increased choices for a support.

The phosphor filling ratio can be controlled by variation of the preparation condition of a phosphor layer. In the case of a vacuum deposition method, for example, an increased vacuum degree at the time of deposition results in a decreased filling ratio of a phosphor.

The phosphor layer thickness is preferably not less than 100 μm and not more than 1500 μm in terms of inhibition of cracking and luminance, and more preferably not less than 200 μm and not more than 1000 μm.

Sealing/Protective Film:

A protective film, which protects a phosphor layer from moisture and prevents the phosphor layer from deterioration, is formed of a film exhibiting a relatively low moisture permeability, such as polyethylene terephthalate (PET) film. In addition to PET, there are usable polyester film, polymethacrylate film, nitrocellulose film, cellulose acetate film, polypropylene film, polyethylene naphthalate film, and the like. Further, to fit necessitated moisture-proofing, such a film may be laminated with plural sheets of deposit film having deposited a metal oxide or the like.

Fusible layers to be sealed with each other by fusion are formed on the opposed surfaces on the substrate side and the phosphor layer side of the image conversion panel. A fusible layer can employ a resin film which is fusible by an impulse sealer. Examples of such a resin film include ethylene-vinyl acetate copolymer (EVA) film, polypropylene (PP) film and polyethylene (PE) film, but are not limited to these.

The image conversion panel is laminated by upper and lower protective films and sealed by fusion of the ends at which the upper and lower protective films are in contact with each other in an atmosphere of reduced pressure.

EXAMPLES

The present invention will be further described in detail with reference to examples, but the invention is by no means limited to these.

Preparation of Radiation Image Conversion Panel 1:

Phosphor raw materials, 20 g of powdery europium oxybromide (EuOBr) and 3300 g of powdery cesium bromide (CsBr) were each weighed and mixed under an environment of 25% RH. The thus mixed phosphor raw materials were placed into a resistance heating crucible and after evacuating the inside of a vapor deposition device to a high vacuum degree, argon gas was introduced thereto so that the vacuum degree was adjusted to $1.0 \times 10^{-2}$ Pa. Subsequently, an aramid film support (linear thermal expansion coefficient: 48 ppm/° C.) subbed with a layer mainly composed of a resin was placed in the vapor deposition device and the support was heated to 60° C. by a heater placed on the side opposite the vapor deposition surface. The resistance heating crucible was heated and the phosphor raw material was vaporized at a rate of 2 μm/min to deposit a CsBr:Eu phosphor. Along with the start of deposition, the substrate temperature was raised 130° C. at a rate of 10° C./min. After completion of deposition, the inside of the device was returned to atmospheric pressure and a phosphor plate (=support+phosphor layer) was taken out from the device. There was formed a phosphor layer (layer thickness: 507 μm) with a structure of columnar phosphor crystals being closely forested approximately in the vertical direction. It was proved that the average filling ratio of the phosphor was 70%, which was determined by the measurement method described below.

The thus obtained phosphor plate was placed into an oven and heated from 30° C. to 150° C. over 90 minutes and then cooled from 150° C. to 30° C. over 4 hours. Thereafter, the phosphor plate was taken out from the oven and covered with a moisture-proofing protective film, and the moisture-proofing protective film was fused at the circumference and sealed by using an impulse sealer, whereby a radiation image conversion panel 1 was prepared.

Measurement of Linear Thermal Expansion Coefficient:

A linear thermal expansion coefficient was measured in the range of 25 to 100° C. in accordance with ASTM D 696.

Preparation of Radiation Image Conversion Panel 2-10:

Radiation image conversion panels 2-10 were each prepare in the same manner as the foregoing radiation image conversion panel 1, except that the kind of a support, amounts of phosphor raw materials and an Ar flow rate were varied so that the linear thermal expansion coefficient of a support, a phosphor layer thickness and an average phosphor filling ratio of the phosphor layer were each values, as shown in table 1.

Evaluation:

Radiation image conversion panels 1-10 were each evaluated, as below.

Average Phosphor Filling Ratio of Phosphor Layer:

A phosphor plate with a size of A cm×A cm was cut out, the layer thickness B (cm) and the mass C (g) were each measured by a micrometer and a balance, respectively, and an average filling ratio D (%) of phosphor was calculated as $D=100C/(A^2 B\rho)$, in which the mass of a support of A cm×A cm was E (g). The average phosphor filling ratio, shown in Table 1 was calculated, based on the specific gravity of CsBr being $\rho=4.43$.

Cracking Resistance:

A phosphor plate was taken out from the oven and the phosphor layer thereof was visually observed and evaluated with respect to cracking, based on the following criteria:

5: No cracking was observed over the entire surface,

4: Slight cracking was observed at a part of the circumference,

3: Cracking was observed at a part of the circumference,

2: Cracking was observed in the circumference (in any of The four edges) and cracking was also observed in the central portion, 1: Cracking was observed on the entire surface.

Sharpness:

Radiation image conversion panel samples were each evaluated with respect to sharpness, based on determination of modulated transfer function (MTF). The MTF was determined in the manner that after adhering a CTF chart onto each of the radiation image conversion panel samples, each of the samples was exposed to X-rays of 80 kVp at a dose of 10 mR (distance to the subject: 1.5 m) and then, the CTF chart image was read by scanning with a semiconductor laser of a 100 μm ϕ diameter (680 nm, power on the panel of 40 mW). The values in Table 1 indicate MTF values at 2.0 1p/mm. Obtained results are shown in Table 1.

Luminance:

Evaluation of luminance was conducted by using Regius 350 (made by Konica Minolta Corp.) Similarly to the evaluation of sharpness, each of the samples was exposed to X-rays of 80 kV and 10 mAs at a distance of 2 m between an exposure ray source and a plate and then read by installing a plate in the Regius 350. Relative evaluation was made, based on electric signals obtained from a photomultiplier. Evaluation was represented by a relative value, based on the luminance of radiation image conversion panel 2 being 1.0.

Evaluation results are shown in Table 1.

TABLE 1

| Radiation Image Conversion Panel | Linear Thermal Expansion Coefficient of Support (ppm/° C.) | Phosphor Layer Thickness (μm) | Average Phosphor Filling Ratio of Phosphor Layer (%) | Cracking Resistance | Luminance | Sharpness (%) | Remark |
|---|---|---|---|---|---|---|---|
| 1 | 48 | 507 | 70 | 5 | 4.5 | 40 | Inv. |
| 2 | 13 | 490 | 64 | 1 | 1.0 | 22 | Comp. |
| 3 | 32 | 485 | 75 | 5 | 4.3 | 41 | Inv. |
| 4 | 56 | 498 | 80 | 5 | 4.3 | 39 | Inv. |
| 5 | 32 | 181 | 73 | 4 | 3.0 | 39 | Inv. |
| 6 | 28 | 501 | 92 | 3 | 3.0 | 30 | Inv. |
| 7 | 13 | 511 | 89 | 1 | 1.2 | 24 | Comp. |
| 8 | 65 | 850 | 63 | 3 | 3.1 | 32 | Inv. |
| 9 | 56 | 800 | 82 | 5 | 4.4 | 40 | Inv. |
| 10 | 72 | 767 | 84 | 1 | 1.3 | 22 | Comp. |

As is apparent from Table 1, it was proved that radiation image conversion panels according to the invention were superior in cracking resistance, luminance and sharpness, as compared to radiation image conversion panels of comparison.

What is claimed is:

1. A radiation image conversion panel, wherein the radiation image conversion panel comprises, on a support, a phosphor layer formed by a process of vapor growth and the support comprises a resin and exhibits a linear thermal expansion coefficient of 20 to 70 ppm/° C.

2. The radiation image conversion panel as claimed in claim 1, wherein the linear thermal expansion coefficient is from 30 to 60 ppm/° C.

3. The radiation image conversion panel as claimed in claim 1, wherein an average filling ratio of a phosphor in the phosphor layer is from 60 to 90%.

4. The radiation image conversion panel as claimed in claim 3, wherein the average filling ratio of a phosphor in the phosphor layer is 65% to 85%.

5. The radiation image conversion panel as claimed in claim 1, wherein a thickness of the phosphor layer is from 100 to 1500 μm.

6. The radiation image conversion panel as claimed in claim 5, wherein the thickness of the phosphor layer is from 200 to 1000 μm.

7. A method of producing a radiation image conversion panel comprising a phosphor layer on a support, the method comprising:

depositing a phosphor on the support to form the phosphor layer, wherein the support comprises a resin and exhibits a linear thermal expansion coefficient of 20 to 70 ppm/° C.

8. The method as claimed in claim 7, wherein the linear thermal expansion coefficient is from 30 to 60 ppm/° C.

9. The method as claimed in claim 7, wherein an average filling ratio of a phosphor in the phosphor layer is from b αto 90%.

10. The method as claimed in claim 9, wherein the average filling ratio of a phosphor in the phosphor layer is 65% to 85%.

11. The method as claimed in claim 7, wherein a thickness of the phosphor layer is from 100 to 1500 μm.

12. The method as claimed in claim 11, wherein the thickness of the phosphor layer is from 200 to 1000 μm.

* * * * *